March 14, 1950
T. FRIEDMAN
2,500,897
RETAINING BODY HAVING A SHOULDERED
RECESS FOR A MIRROR OR THE LIKE
Original Filed April 15, 1946
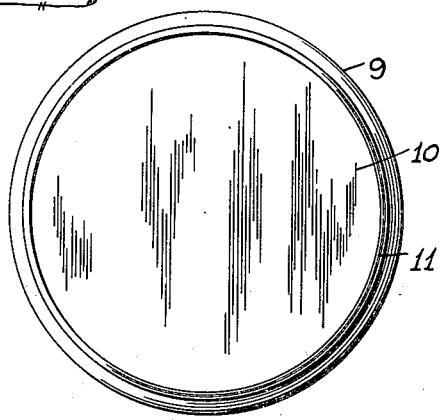
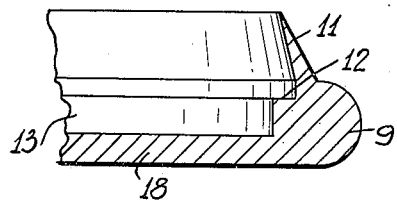
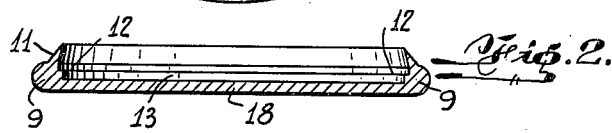
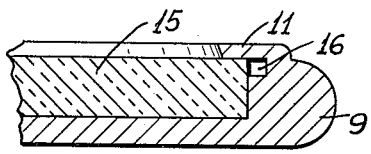
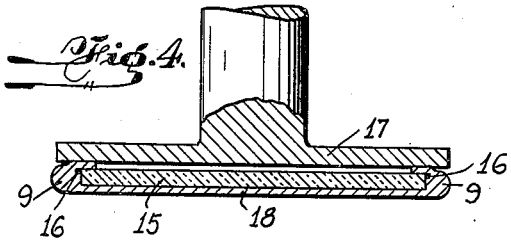
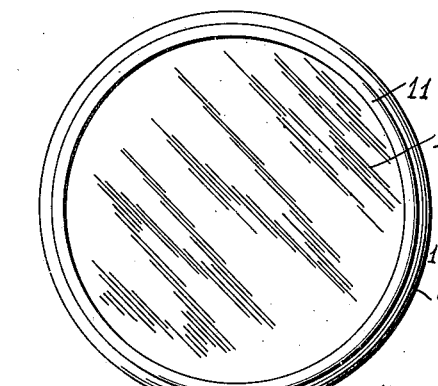
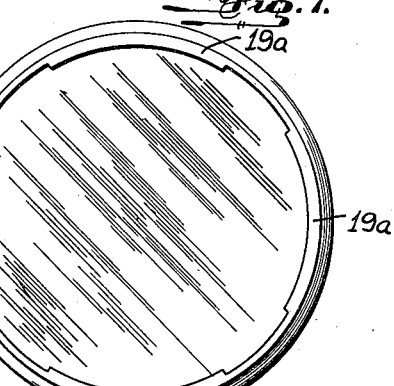
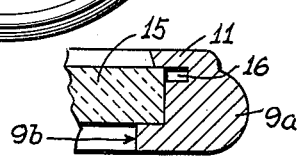
INVENTOR.
THEODORE FRIEDMAN
BY
ATTORNEY.

Patented Mar. 14, 1950

2,500,897

UNITED STATES PATENT OFFICE 2,500,897

RETAINING BODY HAVING A SHOULDERED RECESS FOR A MIRROR OR THE LIKE

Theodore Friedman, New York, N. Y.

Original application April 15, 1946, Serial No. 662,376. Divided and this application November 14, 1947, Serial No. 785,879

1 Claim. (Cl. 88—96)

This invention relates to a new type of holder and/or retaining means, particularly adapted to hold and/or retain a part or object in engagement with a body.

It is an object of the present invention to provide a body with economical, efficient, practical and simple retaining means which is adapted to be bent or otherwise formed for securely holding in locking engagement a member, such as, for example, a mirror or compact against a surface of the body.

It is a further object of the present invention to provide a plastic body with a novel plastic locking flange adapted to maintain a member against a surface of the body. The process for forming and producing such locking flange and/or for locking a member to said flange is set forth and claimed in my co-pending application, Serial Number 662,376 (which matured into Patent No. 2,431,238), this application being a division thereof.

Another object of the invention is to enable one to produce hand mirrors and other objects, with conventional backing or rest in a labor saving manner and without incurring extensive costs.

A still further object of this invention is to provide a new form of retainer, which will hold a mirror or other object rigidly, against a rest or backing.

These and other objects, as it will hereinafter appear, are accomplished by this invention, examples incorporating the same being described in the following specification and shown in the accompanying drawing in which:

Fig. 1 is a plan view of a body having a backing or rest and made in accordance with the invention.

Fig. 2 is a cross-sectional view of said body.

Fig. 3 is an enlarged cross-sectional partial view of the body shown in Figs. 1 and 2.

Fig. 4 portrays the formation of the retainer lip by employing a flat press.

Fig. 5 is an enlarged cross-sectional partial view of the newly formed retainer lip holding an object such as a mirror in place.

Fig. 6 is a plan view showing the body after the press has formed the retainer lip locking a mirror against a rest of the body.

Fig. 7 is a plan view of a finished mirror and body embodying the invention in a modified form.

Fig. 8 is a sectional view of a further application of the invention.

Referring now more particularly to the drawing, the entire body 10 and annular lip 11 are combined in one piece of plastic, metal, or any other applicable material. Outer surface 9 is preferably well rounded for both design and safety.

As seen in Figs. 2 and 3, annular flange 11 is normally preferably slantingly and inwardly directed, and preferably tapered to facilitate easy forming of the annular lip when mirror 15 or any other member to be locked, is placed in cavity or recess 13. Shoulder 12 on body 10 is provided to give the necessary clearance 16 when the lip 11 is bent or formed over the mirror 15. In this manner, a firm grasp can be made by the lip's lower edge on the mirror surface. The mirror rests on the bottom 18 of recess 13.

When mirror 15 is placed in recess 13, press 17 (when operated) bends tapered flange 11 directly over the edge portion of mirror 15. The lip itself loses its tapered shape due to the action of the press 17 and becomes substantially uniform in cross-section. A clear picture can be seen in Fig. 5. Fig. 6 shows a plan view of the bent lip and mirror in place.

Although applicable to metal backings or bodies the invention is particularly applicable for use in connection with thermoplastic bodies. It has heretofore been the custom to heat the conventional plastic retainer flange and then either manually or with a press, force this flange over the edge of the mirror or other object to be retained. It is now evident, that by providing a flange substantially as depicted in the drawing, the flange may be forced over the edge of the mirror (to form the lip), without heating the material by either a cold die or press. To facilitate the operation, a heating unit may be embodied in the closing die.

In Fig. 7 variation in the design of the lip is shown. For both cost and manufacturing simplicity any number of smaller lips 19a may be employed instead of the completely annular lip 11 as seen in Fig. 6.

In Fig. 8 the rest extending inwardly from body 9a for the mirror 15 or other object is shown as an annular flange 9b.

Although in accordance with the provisions of the patent statutes I have described my invention in certain particular forms designed for certain specific uses, I would have it distinctly understood that the forms disclosed and the methods of use described are merely illustrative and that the invention is not limited thereto since modifications, and alterations will readily suggest themselves to workers skilled in this art without

I claim:

An article of manufacture comprising a body, a recess formed in a surface of said body for receiving a member, the side wall of said recess having a peripheral step to form a shoulder facing in the direction of said surface, and a tapered flange extending from the outer edge of said step, the inner and outer surfaces of said flange being inclined towards said recess.

THEODORE FRIEDMAN.

REFERENCES CITED

The following references are of record in the file of this patent:

UNITED STATES PATENTS

| Number | Name | Date |
|---|---|---|
| 413,242 | Pattison | Oct. 22, 1889 |
| 594,495 | Spohn | Nov. 30, 1897 |
| 1,775,915 | Peterson | Sept. 16, 1930 |
| 1,981,334 | Schmalz | Nov. 20, 1934 |
| 2,132,106 | Graham | Oct. 4, 1938 |
| 2,362,434 | Fitch et al. | Nov. 7, 1944 |
| 2,431,238 | Friedman | Nov. 18, 1947 |

FOREIGN PATENTS

| Number | Country | Date |
|---|---|---|
| 512,419 | Great Britain | Sept. 15, 1939 |